United States Patent [19]

Andersen et al.

[11] 3,928,567

[45] Dec. 23, 1975

[54] DIETARY SUPPLEMENT

[76] Inventors: Ariel A. Andersen, 1074 Ash Ave., Provo, Utah 84601; Wayne B. Binns, 555 N. 300 East, Logan, Utah 84321

[22] Filed: Aug. 26, 1974

[21] Appl. No.: 500,304

[52] U.S. Cl.................................. 424/94; 424/153
[51] Int. Cl.² .................. A61K 33/14; A61K 37/48
[58] Field of Search............................. 424/94, 153

[56] References Cited
UNITED STATES PATENTS

| | | | |
|---|---|---|---|
| 2,224,252 | 12/1940 | Callaway | 99/1 |
| 2,764,485 | 9/1956 | Bash et al. | 424/94 |
| 3,287,220 | 11/1966 | Martin | 424/94 |
| 3,337,404 | 8/1967 | Polli et al. | 424/153 |

OTHER PUBLICATIONS

Chem. Abst. Vol. 79, (1973) — 103947Z.

*Primary Examiner*—Stanley J. Friedman
*Attorney, Agent, or Firm*—Lawrence J. Winter

[57] ABSTRACT

A dietary supplement composition for the treatment of allergy and for the improvement of health, consisting of a mixture in which the essential components are compressed into tablets and comprise potassium chloride and Brewer's yeast.

6 Claims, No Drawings

DIETARY SUPPLEMENT

The present invention relates to dietary supplements and has as its general object to provide an improved composition constituting an excellent source of certain vital food elements, in easily assimilable form.

More especially, the invention aims to provide a dietary food supplement constituting a source of food elements which are readily available and may be easily prepared in tablet form for convenient use.

It is another object of the present invention to provide a composition consisting of two elements, one of which is a food supplement product and the other of which is a mineral salt. These food elements are not toxic and they are normally present in the human diet but usually not present in sufficient quantity or in optimum amounts or proportions for full health.

Another object of the present invention is to provide a dietary supplement that comprises potassium chloride which is readily commercially available and Brewer's yeast which is also commercially available and in which the two elements are mixed in the right proportion and pressed into tablets.

As is well known a decreasing content of potassium in some heavily cropped soils, (where potassium is not added back in the form of fertilizer) has caused a consequent decrease in the content of potassium in foods that are produced in such soils, and thus there has been created in some cases a deficiency in the human diet and this followed by a metabolic deficiency. This deficiency in the human body has generally gone undetected because the level of potassium in the body is determined in the blood plasma, and this is not an accurate measure of what is inside the body cells. For example potassium is 20 times higher in blood cells than in blood plasma.

Since the human body is made up of billions of microscopic cells each of which is a tiny chemical plant and the efficiency of these tiny chemical plants depends on food elements passing through the cell membrane into the cell and the waste products moving out, the transfer of material across the cell membrane or rather the control of this transfer is vital to the efficiency and health and well being of the cells, and in turn the health and well being of the whole human body. This transfer of materials in and out of the cells depend at least in part, on the balance between sodium and potassium ions in the extracellular and intracellular fluids of the body. Potassium is six times higher in muscle cells than sodium and yet the blood plasma or serum supplying these cells contains many times more sodium than potassium. As already mentioned potassium is 20 times higher in blood cells than in the plasma. The reason for the very different distribution, throughout the body, of these two elements, which are so closely alike chemically, is not exactly understood, nor how it is accomplished, and maintained.

There is also another reason for potassium deficiency within the cell. There appears to be one or more factors in Brewer's yeast that seems to be essential in getting the potassium ion into the cell.

Thus, there are two reasons for potassium deficiency: 1) a dietary deficiency of potassium, and 2) a diet lacking the factor (or factors) essential in transferring the potassium into the cell wherein it performs its function. The health and well-being of the person depends on this controlled transfer of substances across the cell membrane.

The level of potassium in blood plasma is maintained at its threshold level by drawing potassium from the cell if necessary. Thus, in a deficient diet potassium in the cell may be diminished below the optimum level for full, efficient operation. It may very well be that some diseases result directly or indirectly from potassium dificiency, which is responsible for, or contributes to, a weakened resistant or inefficiency, and thereby causes illness such as allergy, arthritis, cardiac arrest, etc.

A number of people suffering with allergy have been successfully treated with the potassium chloride-Brewer's yeast composition described in this patent application. Neither one alone seem to help. The inventors believe that cardiac arrest may be caused by failure of heart muscle cells due to potassium dificiency.

Toward the attainment of the foregoing generally stated objects, the invention contemplates a dietary supplement composition which comprises combining potassium chloride with Brewer's yeast in the right proportions to produce an improvement in health when added to the diet within certain limits and amounts. In accordance with the present invention, it has been discovered that the combination of potassium chloride and Brewer's yeast in any well known or conventional tablet making machine in a combination of 0.1 gram of potassium chloride and 0.5 gram (7.5 grains) of Brewer's yeast has enhanced the diet. Also, it appears that the optimum amount added to the human diet for an adult ranges from 6 to 10 tablets per day in accordance with the above mentioned combination. This composition and amount could also be used in capsules or other ways. As Brewer's yeast and potassium chloride are readily commercially available, the invention further can be widely and economically achieved.

Although, the above example represents the preferred embodiment of the present invention, those versed in chemistry will appreciate that other or similar proportions may be made without departing from the spirit or the principle hereof. The invention is rather that defined by the claims.

What is claimed is:

1. A food dietary supplement composition consisting of Brewer's yeast and Potassium Chloride with said yeast being in the range of between 3 and 5 grams per day by weight and said Potassium Chloride being in the ranges of 0.3 to 1.0 gram by weight.

2. The composition of claim 1 wherein said Brewer's yeast is substantially 5 parts by weight and said Potassium Chloride is substantially 1 part by weight.

3. The composition of claim 1 wherein the material is in tablet form of suitable size.

4. The composition of claim 1 wherein the material is in capsule form of suitable size.

5. The composition of claim 1 wherein the material is in granular or powder form.

6. A food dietary dupplement composition consisting of Brewer's yeast comprised substantially of between 0.05 to 0.1 grams of Potassium Chloride by weight and substantially 0.5 grams (7.5 grains) of Brewer's yeast by weight.

* * * * *